(12) United States Patent
Kase et al.

(10) Patent No.: US 7,803,214 B2
(45) Date of Patent: Sep. 28, 2010

(54) ASYMMETRIC HOLLOW-FIBER GAS SEPARATION MEMBRANE, GAS SEPARATION METHOD AND GAS SEPARATION MEMBRANE MODULE

(75) Inventors: Yoji Kase, Chiba (JP); Toshimune Yoshinaga, Chiba (JP); Kenji Fukunaga, Chiba (JP); Harutoshi Hoshino, Chiba (JP)

(73) Assignee: UBE Industries, Ltd., Ube-Shi (JP)

( * ) Notice: Subject to any disclaimer, the term of this patent is extended or adjusted under 35 U.S.C. 154(b) by 598 days.

(21) Appl. No.: 11/878,206

(22) Filed: Jul. 23, 2007

(65) Prior Publication Data

US 2008/0017029 A1 Jan. 24, 2008

(30) Foreign Application Priority Data

Jul. 21, 2006 (JP) ............................. 2006-200113

(51) Int. Cl.
*B01D 53/22* (2006.01)
(52) U.S. Cl. ..................................... 95/54; 96/8; 96/10
(58) Field of Classification Search ...................... 95/45, 95/50, 54; 96/8, 10, 12, 13, 14
See application file for complete search history.

(56) References Cited

U.S. PATENT DOCUMENTS

| | | | | |
|---|---|---|---|---|
| 3,822,202 A | * | 7/1974 | Hoehn et al. ................... 95/55 |
| 3,899,309 A | * | 8/1975 | Hoehn et al. ................... 95/54 |
| 4,113,628 A | * | 9/1978 | Alegranti ................ 210/500.23 |
| 4,240,914 A | * | 12/1980 | Iwama et al. ........... 210/500.39 |
| 4,378,324 A | * | 3/1983 | Makino et al. ................. 264/41 |
| 4,378,400 A | * | 3/1983 | Makino et al. .................. 96/13 |
| 4,440,643 A | * | 4/1984 | Makino et al. ......... 210/500.28 |
| 4,474,662 A | * | 10/1984 | Makino et al. ......... 210/500.39 |
| 4,485,056 A | * | 11/1984 | Makino et al. ................. 264/41 |
| 4,528,004 A | * | 7/1985 | Makino et al. .................. 96/13 |
| 4,690,873 A | * | 9/1987 | Makino et al. .................. 96/10 |
| 4,838,900 A | * | 6/1989 | Hayes ............................ 95/54 |
| 4,929,405 A | * | 5/1990 | Kohn ........................... 264/41 |
| 4,932,982 A | * | 6/1990 | Hayes ............................ 95/51 |
| 5,076,816 A | * | 12/1991 | Avrillon et al. ................. 95/51 |

(Continued)

FOREIGN PATENT DOCUMENTS

EP 446947 A2 * 9/1991

(Continued)

*Primary Examiner*—Duane Smith
*Assistant Examiner*—Sonji Turner
(74) *Attorney, Agent, or Firm*—Young & Thompson

(57) ABSTRACT

The present invention relates to an asymmetric hollow-fiber gas separation membrane made of a polyimide having a specific repeating unit, an improved tensile elongation at break of 15% or more as a hollow-fiber membrane itself, an oxygen gas permeation rate ($P'_{O2}$) of $4.0 \times 10^{-5}$ cm$^3$(STP)/cm$^2 \cdot$sec$\cdot$cmHg or more and a gas ratio of permeation rate of oxygen to nitrogen ($P'_{O2}/P'_{N2}$) of 4 or more that are measured at 50° C., a gas separation method and a gas separation membrane module using the asymmetric hollow-fiber gas separation membrane.

In addition, the present invention relates to an asymmetric hollow-fiber gas separation membrane obtained by heat-treating the asymmetric hollow-fiber gas separation membrane at a maximum temperature of from 350 to 450° C. The asymmetric hollow-fiber gas separation membrane has sufficient mechanical strength even after the heat-treatment at a maximum temperature of from 350 to 450° C.

14 Claims, 3 Drawing Sheets

U.S. PATENT DOCUMENTS

| | | | |
|---|---|---|---|
| 5,178,940 A * | 1/1993 | Matsumoto et al. | 96/13 |
| 5,246,743 A * | 9/1993 | Kusuki et al. | 427/569 |
| 5,282,964 A * | 2/1994 | Young et al. | 210/321.8 |
| 5,286,539 A * | 2/1994 | Kusuki et al. | 96/10 |
| 5,391,219 A * | 2/1995 | Matsumoto et al. | 95/51 |
| 5,468,430 A * | 11/1995 | Ekiner et al. | 264/28 |
| 5,591,250 A * | 1/1997 | Stern et al. | 95/51 |
| 5,618,334 A * | 4/1997 | Ozcayir et al. | 96/14 |
| 5,744,575 A * | 4/1998 | Nakanishi et al. | 528/353 |
| 5,859,182 A * | 1/1999 | Hachisuka et al. | 528/401 |
| 6,136,073 A * | 10/2000 | Coan et al. | 96/8 |
| 6,183,639 B1 * | 2/2001 | de Winter | 210/321.8 |
| 6,395,066 B1 * | 5/2002 | Tanihara et al. | 95/47 |
| 6,464,755 B2 * | 10/2002 | Nakanishi et al. | 95/52 |
| 6,709,491 B2 * | 3/2004 | Kawakami et al. | 96/4 |
| 2004/0107830 A1 * | 6/2004 | Simmons et al. | 95/45 |
| 2004/0177753 A1 * | 9/2004 | Chung et al. | 95/43 |
| 2008/0134885 A1 * | 6/2008 | Yoshinaga et al. | 95/47 |

FOREIGN PATENT DOCUMENTS

| | | |
|---|---|---|
| JP | 3-267130 | 11/1991 |
| JP | 6-254367 | 9/1994 |
| JP | 2004-267810 * | 9/2004 |

* cited by examiner

ASYMMETRIC HOLLOW-FIBER GAS SEPARATION MEMBRANE, GAS SEPARATION METHOD AND GAS SEPARATION MEMBRANE MODULE

BACKGROUND OF THE INVENTION

1. Field of the Invention

The present invention relates to an asymmetric hollow-fiber gas separation membrane made of a polyimide, having an excellent gas separation performance and an improved mechanical strength, wherein the polyimide is composed of a specific aromatic tetracarboxylic acid and an aromatic diamine.

2. Description of the Related Art

Patent Documents 1 and 2 disclose an asymmetric hollow-fiber gas separation membrane made of a polyimide, having an adequate ratio of permeation rate of oxygen to nitrogen gas, wherein the polyimide is formed from a specific aromatic tetracarboxylic acid and an aromatic diamine.

Patent Document 1: Japanese Patent Laid-Open Publication No. H03-267130

Patent Document 2: Japanese Patent Laid-Open Publication No. H06-254367

SUMMARY OF THE INVENTION

The asymmetric hollow-fiber gas separation membrane disclosed in Patent Documents 1 and 2 has an adequate gas separation performance including an adequate ratio (gas separation ratio) of the permeation rate of oxygen to nitrogen gas as described above. However, the mechanical strength of the membrane still has room for improvement. Therefore, it is an object of the present invention to provide an asymmetric hollow-fiber gas separation membrane having an improved mechanical strength without lowering greatly the gas separation performance, although the asymmetric hollow-fiber gas separation membrane is made of a polyimide similar to the polyimide having the repeating unit disclosed in Patent Documents 1 and 2. It is also an object of the present invention to provide a gas separation method of permeating oxygen gas selectively and separating it from a mixed gas that contains oxygen gas and nitrogen gas with the asymmetric hollow-fiber gas separation membrane.

Further, it is an object of the present invention to provide an asymmetric hollow-fiber gas separation membrane that has sufficient mechanical strength even after the membrane is heat-treated at high temperatures. The asymmetric hollow-fiber gas separation membrane after having the heat-treatment can separate suitably a mixed gas that contains organic compound vapor.

The present invention relates to an asymmetric hollow-fiber gas separation membrane that is made of a polyimide composed of a repeating unit substantially represented by the following general formula (1):

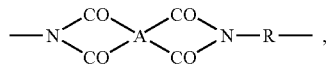

general formula (1)

in the general formula (1), A is characterized in that 20 to 80 mol % of A is a tetravalent unit based on the biphenyl structure represented by the formula (2),

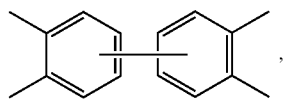

formula (2)

20 to 80 mol % of A is a tetravalent unit based on the diphenylhexafluoropropane

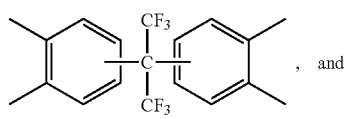

formula (3)

represented by the formula (3), 0 to 30 mol % of A is a tetravalent unit based on the phenyl structure represented by the formula (4), R in the general formula (1) is characterized in that 30 to 70 mol % of R is a divalent unit represented by the formula (5) and/or formula (6),

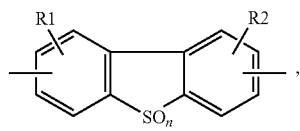

formula (5)

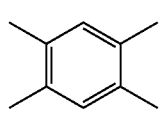

formula (4)

(In the formula, each of R1 and R2 is a hydrogen atom or an organic group; n is any number of 0, 1, and 2.)

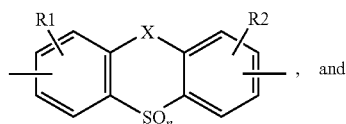

formula (6)

(In the formula, each of R1 and R2 is a hydrogen atom or an organic group; X is —CH$_2$— or —CO—.)

30 to 70 mol % of R is a divalent unit based on the biphenyl structure represented by the formula (7),

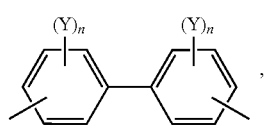

formula (7)

(In the Formula, Y is a Chlorine or Bromine Atom; N is any Number of 1 to 3.)

The asymmetric hollow-fiber gas separation membrane has an improved tensile elongation at break of 15% or more. Preferably, the asymmetric hollow-fiber gas separation membrane has an oxygen gas permeation rate (P'$_{O2}$) of 4.0×10$^{-5}$ cm³(STP)/cm²·sec·cmHg or more and a gas ratio of permeation rate of oxygen to nitrogen ($P'_{O2}/P'_{N2}$) of 4 or more.

Further, the present invention relates to a gas separation method characterized by recovering an oxygen-enriched mixed gas and a nitrogen-enriched mixed gas from a mixed gas containing oxygen gas and nitrogen gas by contacting the mixed gas containing oxygen gas and nitrogen gas to the gas feed side of the asymmetric hollow-fiber gas separation membrane and selectively permeating the oxygen gas to the gas permeation side of the asymmetric hollow-fiber gas separation membrane. In particular, the present invention relates to a gas separation method characterized by selecting the bore-side of the asymmetric hollow-fiber gas separation membrane as the gas feed side and the outside of the asymmetric hollow-fiber gas separation membrane as the gas permeation side.

Still further, the present invention relates to a hollow-fiber gas separation membrane module characterized in that a hollow-fiber element is accommodated in a vessel; the hollow-fiber element is essentially composed of a hollow-fiber bundle formed by binding a number of the asymmetric hollow-fiber gas separation membranes and the tube plate embedding and fixing at least one end of the hollow-fiber bundle while each end of the hollow-fiber membrane is opened; the vessel has an inlet for mixed gas, an outlet for non-permeated gas, and an outlet for permeated gas; and the hollow-fiber element is accommodated in the vessel in such a manner that the bore-side space of the asymmetric hollow-fiber membranes is isolated from the outside room thereof.

The present invention provides an asymmetric hollow-fiber gas separation membrane that is made of a polyimide similar to the polyimide composed of the repeating unit disclosed in Patent Documents 1 and 2 but has an improved mechanical strength, without lowering greatly the gas separation performance. The present invention further provides a gas separation method of selectively permeating and separating oxygen gas from a mixed gas containing oxygen gas and nitrogen gas by using the asymmetric hollow-fiber gas separation membrane.

Still further, the present invention relates to an asymmetric hollow-fiber gas separation membrane that is obtained by heat-treating the foregoing asymmetric hollow-fiber gas separation membrane at a maximum temperature in the range of 350° C. to 450° C. Still further, the present invention relates to a gas separation method characterized by separating and recovering a mixed gas enriched with organic compound vapor by contacting a mixed gas containing the organic compound vapor to the gas feed side of the asymmetric hollow-fiber gas separation membrane obtained as described above through the heat-treatment at a maximum temperature in the range of 350° C. to 450° C., and by permeating selectively the organic compound vapor to the gas permeation side of the asymmetric hollow-fiber gas separation membrane. Still further, the present invention relates to a hollow-fiber gas separation module characterized in that a hollow-fiber element is accommodated in a vessel; the hollow-fiber element is essentially composed of a hollow-fiber bundle formed by binding a number of the asymmetric hollow-fiber gas separation membranes that are obtained by the heat-treatment at a maximum temperature in the range of 350° C. to 450° C. and the tube plate that is fixed on at least one end of the hollow-fiber bundle in such a manner that each end of the hollow-fiber membrane is embedded and fixed by the tube plate while each end is opened; the vessel has an inlet for mixed gas, an outlet for non-permeated gas, and an outlet for permeated gas; the hollow-fiber element is accommodated in the vessel in such a manner that the bore-side space of the asymmetric hollow-fiber gas separation membranes is isolated from the outside room of the membranes.

The present invention provides an asymmetric hollow-fiber gas separation membrane that has sufficient mechanical strength even after the heat-treatment at a maximum temperature in the range of 350° C. to 450° C. The asymmetric hollow-fiber gas separation membrane after the heat-treatment can suitably separate a mixed gas that contains organic compound vapor.

DETAILED DESCRIPTION OF THE INVENTION

Figure 1:
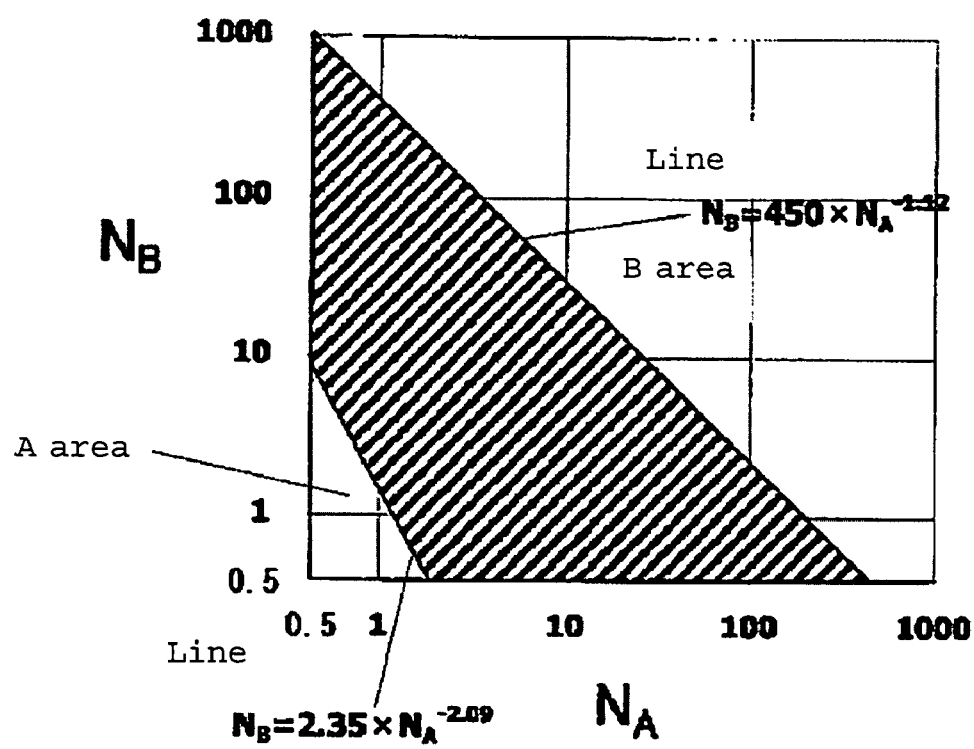
FIG. 1 shows a graph illustrating the range of combination of $N_A$ and $N_B$.

The asymmetric hollow-fiber gas separation membrane of the present invention is made of a polyimide composed of a repeating unit substantially represented by the following general formula (1):

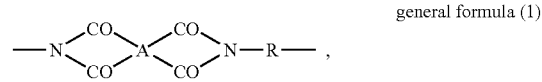

general formula (1)

in the general formula (1), A is characterized in that 20 to 80 mol % of A is a tetravalent unit based on the biphenyl structure represented by the formula (2),

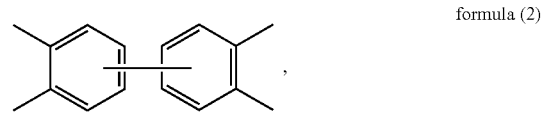

formula (2)

20 to 80 mol % of A is a tetravalent unit based on the diphenylhexafluoropropane structure represented by the formula (3),

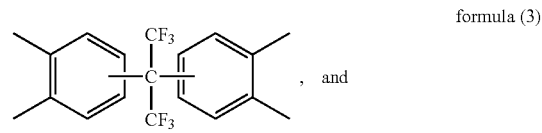

formula (3)

and 0 to 30 mol % of A is a tetravalent unit based on the phenyl structure represented by the formula (4),

formula (4)

R in the general formula (1) is characterized in that 30 to 70 mol % of R is a divalent unit represented by the formula (5) and/or formula (6),

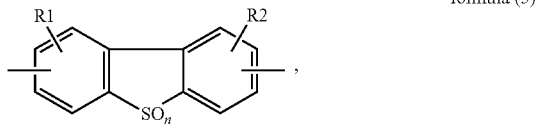

formula (5)

(In the formula, each of R1 and R2 is a hydrogen atom or an organic group; n is any number of 0, 1, and 2.)

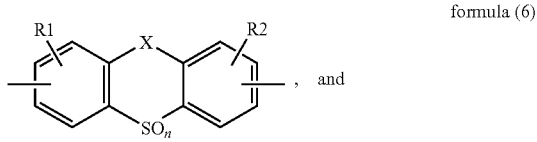

formula (6)

(In the formula, each of R1 and R2 is a hydrogen atom or an organic group; X is —CH$_2$— or —CO—.)

30 to 70 mol % of R is a divalent unit based on the biphenyl structure represented by the formula (7),

formula (7)

(In the Formula, Y is a Chlorine or Bromine Atom; and N is any Number of 1 to 3.)

In the foregoing polyimide, as the tetravalent unit based on the biphenyl structure of the formula (2) derived from tetracarboxylic acid, there may be exemplified a residue of biphenyltetracarboxylic acids such as 3,3',4,4'-biphenyltetracarboxylic acid or its acid anhydride and 2,3,3',4'-biphenyltetracarboxylic acid or its acid anhydride. The tetravalent unit based on the biphenyl structure of the formula (2) is contained in A in an amount of from 20 to 80 mol % and preferably from 25 to 75 mol %. When the amount of the tetravalent unit is too small, membrane preparation becomes difficult. Too much amount undesirably lowers the gas permeation rate.

As the tetravalent unit based on the diphenylhexafluoropropane structure of the formula (3), there may be exemplified a residue of diphenylhexafluoropropanes such as 2,2-bis (3,4-dicarboxyphenyl) hexafluoropropane or its acid anhydride. The tetravalent unit based on the diphenylhexafluoropropane structure of the formula (3) is contained in A in an amount of from 20 to 80 mol % and preferably 25 to 75 mol %.

When the amount of the tetravalent unit is too small, the gas permeation rate is lowered. Too much amount undesirably lowers the mechanical strength.

As the tetravalent unit based on the phenyl structure of the formula (4), there may be exemplified a residue of pyromellitic acids such as pyromellitic acid or its acid anhydride. The tetravalent unit based on the phenyl structure of the formula (4) is contained in A in an amount of from 0 to 30 mol % and preferably from 5 to 25 mol %. The pyromellitic acids are suitably used to enhance the mechanical strength, but when the amount of the pyromellitic acids is too much, the polymer solution used for membrane preparation undesirably becomes coagulated or unstable.

As the divalent unit composed of the structure represented by the general formula (5) or the general formula (6), there may be exemplified a residue of the aromatic diamine represented by the following general formulas (8) and (9). The divalent unit is contained in R in the general formula (1) in an amount of from 30 mol % to 70 and preferably 30 to 60 mol %. The divalent unit improves the gas permeability, but too much amount possibly lowers the gas separation ratio.

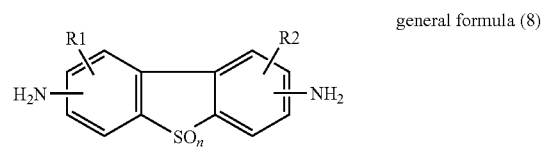

general formula (8)

(In the formula, each of R1 and R2 is a hydrogen atom or an organic group; n is any number of 0, 1, and 2.)

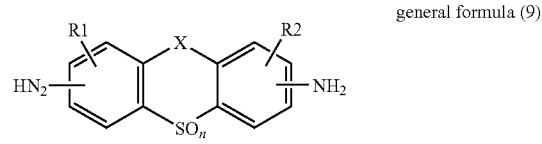

general formula (9)

(In the formula, each of R1 and R2 is a hydrogen atom or an organic group; X is —CH$_2$— or —CO—.)

As the aromatic diamine represented by the general formula (8), there may be mentioned preferably diaminodibenzothiophenes that are given by selecting the number of 0 as n in the general formula (8) and are represented by the following general formula (10), or diaminodibenzothiophene=5,5-dioxides that are given by selecting the number of 2 as n in the general formula (8) and are represented by the following general formula (11).

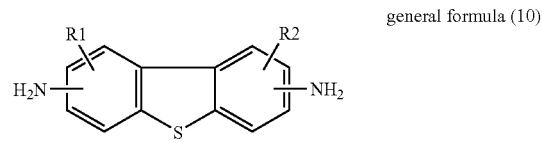

general formula (10)

(In the formula, each of R1 and R2 is a hydrogen atom or organic group.)

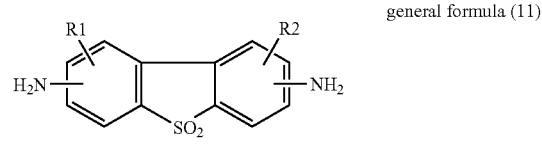

general formula (11)

(In the formula, any of R1 and R2 is a hydrogen atom or an organic group.)

The diaminodibenzothiophens of the general formula (10) may include, for example, 3,7-diamino-2,8-dimethyldibenzothiophene, 3,7-diamino-2,6-dimethyldibenzothiophene, 3,7-diamino-4,6-dimethyldibenzothiophene, 2,8-diamino-3,7-dimethyldibenzothiophene, 3,7-diamino-2,8-diethyldibenzothiophene, 3,7-diamino-2,6-diethyldibenzothiophene, 3,7-diamino-4,6-diethyldibenzothiophene, 3,7-diamino-2,8-dipropyldibenzothiophene, 3,7-diamino-2,6-dipropyldibenzothiophene, 3,7-diamino-4,6-dipropyldibenzothiophene, 3,7-diamino-2,8-dimethoxydibenzothiophene, 3,7-diamino-2,6-dimethoxydibenzothiophene, and 3,7-diamino-4,6-dimethoxydibenzothiophene.

The diaminodibenzothiophene=5,5-dioxides of the general formula (11) may include, for example, 3,7-diamino-2,8-dimethyldibenzothiophene=5,5-dioxide, 3,7-diamino-2,6-dimethyldibenzothiophene=5,5-dioxide, 3,7-diamino-4,6-dimethyldibenzothiophene=5,5-dioxide, 2,8-diamino-3,7-dimethyldibenzothiophene=5,5-dioxide, 3,7-diamino-2,8-diethyldibenzothiophene=5,5-dioxide, 3,7-diamino-2,6-diethyldibenzothiophene=5,5-dioxide, 3,7-diamino-4,6-diethyldibenzothiophene=5,5-dioxide, 3,7-diamino-2,8-dipropyldibenzothiophene=5,5-dioxide, 3,7-diamino-2,6-dipropyldibenzothiophene=5,5-dioxide, 3,7-diamino-4,6-dipropyldibenzothiophene=5,5-dioxide, 3,7-diamino-2,8-dimethoxydibenzothiophene=5,5-dioxide, 3,7-diamino-2,6-dimethoxydibenzothiophene=5,5-dioxide, and 3,7-diamino-4,6-dimethoxydibenzothiophene=5,5-dioxide.

The diaminothioxanthene-10,10-diones that are given by selecting —$CH_2$— as X in the general formula (9) may include, for example, 3,6-diaminothioxanthene-10,10-dione, 2,7-diaminothioxanthene-10,10-dione, 3,6-diamino-2,7-diamethylthioxanthene-10,10-dione, 3,6-diamino-2,8-diethylthioxanthene-10,10-dione, 3,6-diamino-2,8-dipropylthioxanthene-10,10-dione, and 3,6-diamino-2,8-dimethoxythioxanthene-10,10-dione.

The diaminothioxanthene-9,10,10-triones that are given by selecting —CO— as X in the general formula (9) may include, for example, 3,6-diamino-thioxanthene-9,10,10-trione and 2,7-diamino-thioxanthene-9,10,10-trione.

As the divalent unit based on the biphenyl structure of the formula (7) derived from diamine, there may be exemplified a residue of benzidines such as 2,2',5,5'-tetrachlorobenzidine, 3,3',5,5'-tetrachlorobenzidine, 3,3'-dichlorobenzidine, 2,2'-dichlorobenzidine, 2,2',3,3',5,5'-hexabromobenzidine, 2,2',5,5'-tetrabromobenzidine, 3,3',5,5'-tetrabromobenzidine, 3,3'-dibromobenzidine, 2,2'-dibromobenzidine, and 2,2',3,3',5,5'-hexachlorobenzidine. Among these, the benzidine that is given by selecting chlorine atom as Y in the formula (7) and selecting 2 as n is particularly preferable from the viewpoint of permeation rate and gas separation ratio. The divalent unit based on the biphenyl structure of the formula (7) is contained in R in the general formula (1) in an amount of from 30 to 70 mol % and preferably from 30 to 60 mol %. These benzidines contribute to improve the gas separation ratio, but when the amount is too much, the polymer becomes insoluble and membrane preparation becomes difficult.

The asymmetric hollow-fiber gas separation membrane of the present invention exerts its effect by having the repeating unit represented by the general formula (1) derived substantially from the above-mentioned tetracarboxylic acid and diamine. However, as long as the object of the present invention are not impaired, a unit derived from the other tetracarboxylic acid and diamine may be contained. The other tetracarboxylic acid may include, for example, diphenylether tetracarboxylic acids, benzophenone tetracarboxylic acids, diphenylsulfone tetracarboxylic acids, naphthalene tetracarboxylic acids, diphenylmethane tetracarboxylic acids, and diphenylpropane tetracarboxylic acids. The other amine may include, for example, diaminodiphenylmethanes, diamino-diphenylethers, diaminodibenzothiophenes, diaminobenzophenones, bis(aminophenyl) propanes, phenylenediamines, and diaminobenzoic acids.

Generally an asymmetric hollow-fiber gas separation membrane is produced as follows: a solution of a polyimide prepared by polymerizing and imidizing an equi-molar reaction mixture of tetracarboxylic acid and diamine in an organic polar solvent is used as a dope solution; the dope solution is extruded through a hollow-fiber forming nozzle to obtain a hollow fiber; then the hollow fiber is subjected to coagulation in a coagulation liquid to cause phase inversion. Namely, through the so-called phase inversion process, an asymmetric hollow-fiber membrane composed of a dense layer and a porous layer is formed, and then the resulting membrane is dried after the coagulation liquid is removed.

However, the asymmetric hollow-fiber gas separation membrane of the present invention cannot be obtained, even if the phase inversion process is applied to the dope solution of the polyimide that has the repeating unit of the general formula (1) and is obtained by polymerizing and imidizing randomly tetracarboxylic acid and diamine as disclosed in Patent Documents 1 and 2.

The hollow-fiber gas separation membrane of the present invention is made of a polyimide that has the repeating unit represented by the general formula (1) on average as a whole, but can be produced suitably by applying the phase inversion process to the dope solution of a multi-component polyimide that is obtained by polymerizing and imidizing in such a manner that a specific component among the tetracarboxylic acid and diamine exhibits a predetermined degree of blockness.

Hereinafter, the method of preparing the aforementioned multi-component polyimide used in the present invention will be explained.

The polyimide used in the present invention having the repeating unit of the general formula (1) on average as a whole is obtained by mixing a polyimide component A and a polyimide component B, each having a different monomer composition from each other and a predetermined polymerization degree, and by further polymerizing and imidizing them.

The aforementioned "polyimide component" is composed of source materials of a polyimide (including unreacted tetracarboxylic acid and unreacted diamine) and/or a polymerized and imidized product of the source materials. The polymerized and imidized product includes not only a polymer having a high polymerization degree, but also monomers and oligomers having a low polymerization degree that are present in the initial stage of polymerizing and imidizing the source materials of a polyimide. Namely, the polymerized and imidized product is composed of monomers (formed through imidization between two molecules, that is, one tetracarboxylic acid molecule and one diamine molecule) and/or polymers (formed through imidization among three or more molecules of tetracarboxylic acid and diamine in a total).

In the present invention, the polymerization degree of the polymerized and imidized product is represented in terms of the repeating unit number of the polyimide contained therein. The polymerization degree of monomers is equal to 1 and the polymerization degree of polymers is larger than 1. The polymerization degree of the source materials of a polyimide is defined as 0.5 because they have no repeating units. The polymerization degree of the present invention is calculated in accordance with the polymerization degree as defined above.

The polyimide component A is composed of the source materials of a polyimide A (unreacted tetracarboxylic acid and unreacted diamine) and/or a polymerized and imidized product of the source materials. The polyimide component B is composed of the source materials of a polyimide B (unreacted tetracarboxylic acid and unreacted diamine) and/or a polymerized and imidized product of the source materials.

In the present invention, the polyimide component A includes a fluorine atom-containing source materials. That is, 2,2-bis(3,4-dicarboxyphenyl) hexafluoropropanes that constitutes the diphenylhexafluoropropane structure of the formula (3) are included. On the other hand, the polyimide component B contains no fluorine atom-containing source materials basically.

Even in the case where the polyimide component B contains small amount of the fluorine atom-containing source material, an asymmetric hollow-fiber gas separation membrane may be obtained, but even in that case, most of the total of the fluorine atom-containing source materials are contained in the polyimide component A. The polyimide component B contains 20 mol % or less, particularly 10 mol % or less of the total of the fluorine atom-containing source materials. The other source materials besides the fluorine atom-containing source materials of 2,2-bis(3,4-dicarboxyphenyl) hexafluoropropanes that constitute the diphenylhexafluoropropane structure of the formula (3), that is, the source materials of tetracarboxylic acids and diamines that constitute the structures of the formula (2), formula (4), formula (5), formula (6), and formula (7), have no particular limitations and may be contained in either or both of the polyimide component A and the polyimide component B.

The asymmetric hollow-fiber gas separation membrane of the present invention can be produced by the following steps 1 to 3. Here, $N_A$ is the number average degree of polymerization of the polyimide component A. $N_B$ is the number average degree of polymerization of the polyimide component B.

Step 1: A mixed solution of multi-component polyimide is prepared by mixing the polyimide component A and the polyimide component B in a polymerization degree combination where $N_A$ and $N_B$ satisfy the following mathematical equation (1).

$$2.35 \times N_A^{-2.09} < N_B < 450 \times N_A^{-1.12} \quad \text{(Mathematical 1)}$$

Step 2: The mixed solution of multi-component polyimide is polymerized and imidized.

Step 3: An asymmetric hollow-fiber membrane is prepared from the mixed solution of multi-component polyimide through the phase inversion process.

There are no particular limitations on the specific procedures in the step 1 as long as the mixed solution of multi-component polyimide can be obtained. The mixed solution of multi-component polyimide can be obtained by preparing separately the source materials of the polyimide component A and the source materials of the polyimide component B, if necessary, through polymerization and imidization, and then mixing the resulting source materials together uniformly. Further, in the case where either of the polyimide components involved in the multi-component mixed solution of the step 1 is the source materials thereof (that is, unreacted tetracarboxylic acids and unreacted diamines), a solution is prepared by polymerizing and imidizing the source materials of one of the polyimide components in such a manner that a predetermined number average degree of polymerization is attained, and then the unreacted tetracarboxylic acids and unreacted diamines of the other polyimide component can be added to the solution. In particular, because the polyimide component B with a high molecular weight is effective to improve the mechanical strength of the asymmetric hollow-fiber membrane, a desirable preparation method is that the source materials of the polyimide component B are polymerized and imidized in a polar solvent to obtain the polyimide component B with an appropriate polymerization degree in the step 1, and then the source materials of the polyimide component A are admixed with the polyimide component B so as to obtain the mixed solution of multi-component polyimide.

Here, the process of polymerization and imidization used to obtain polyimide is explained. Polymerization and imidization reaction is performed suitably as follows: tetracarboxylic acid and diamine are reacted in a predetermined composition ratio in a polar solvent in a temperature range of 140° C. or higher and preferably 160° C. or higher and not higher than the boiling point of the solvent to form polyamide acid, which is then imidized through dehydration cyclization. In the case where the polymerization and imidization rate of tetracarboxylic acids and diamines is high enough at low temperatures to attain a predetermined polymerization degree, the reaction may be performed at a temperature of 140° C. or lower. It is desirable that the reaction is performed for 1.2 times and preferably 2 or more times longer than the time until the water accompanied with the dehydration cyclization of polyamic acid is no longer generated, preferably the time until the water accompanied with the dehydration cyclization of polyamic acid is seemingly no longer generated. The end of the water generation can be detected by visually checking whether new water drops are condensed or not in a water trap attached to the reaction system. In this way, a polyimide having a specified polymerization degree can be obtained. If amide acid bonding remains, the blockness of the resulting polyimide would be impaired by exchange reaction. Therefore, in the polymerization and imidization, the percent of imidization is preferably 50% or more, and more preferably the imidization is substantially completed.

In the polymerization and imidization, a polyimide having a relatively high molecular weight (large number average degree of polymerization) can be synthesized by reacting tetracarboxylic acid and diamine in a similar composition ratio with each other. In the case of preparing a polyimide having a relatively high molecular weight at first, it is desirable that diamine is reacted in an amount of from 0.95 to 0.995 parts by mol or from 1.005 to 1.05 parts by mol, particularly from 0.98 to 0.995 parts by mol or from 1.005 to 1.02 parts by mol with respect to 1 part by mol of tetracarboxylic acid to obtain a polyimide component having a relatively high molecular weight.

On the other hand, a polyimide component having a relatively low molecular weight (low number average degree of polymerization) can be prepared by reacting diamine in an amount of 0.98 parts by mol or less or 1.02 parts by mol or more with respect to 1 part by mol of tetracarboxylic acid.

The mixed solution of multi-component polyimide obtained in the step 1 desirably has a composition ratio of the total number of mols of diamine with respect to the total number of mols of tetracarboxylic acid ((total number of mols of diamine)/(total number of mols of tetracarboxylic acid)) of from 0.95 to 0.99 or from 1.01 to 1.05 parts by mol, more preferably from 0.96 to 0.99 or from 1.015 to 1.04 parts by mol, because the mixed solution of multi-component polyimide obtained in the step 2 can attain an adequate polymerization degree or an adequate solution viscosity.

The combination range of $N_A$ and $N_B$ specified by the mathematical equation is shown by the slash-marked area in FIG. 1. With the combination in the A area in FIG. 1, it is difficult to obtain an asymmetric hollow-fiber gas separation membrane having an improved mechanical strength. With the combination in the B area in FIG. 1, it is difficult to obtain an asymmetric hollow-fiber gas separation membrane having an improved gas separation performance.

In the step 2, the mixed solution of multi-component polyimide that is composed of the polyimide component A and the polyimide component B and is obtained in the step 1 is further allowed to polymerize and imidize to obtain a mixed solution of multi-component polyimide that has an adequate polymerization degree and contains, besides at least a polymer composed of the polyimide component A and a polymer composed of the polyimide component B, a di- or multi-block copolymer having a block of the polyimide component A and polyimide component B at each end that are bonded together. Here, the di-block copolymer is a copolymer composed of one block of the polyimide component A and one block of the polyimide component B that are bonded together at each end. The multi-block copolymer is a copolymer composed of the di-block copolymer whose ends are bonded with at least one of these two kinds of blocks. The di- or multi-block copolymer may include a portion in which a number of the blocks of the polyimide component A are bonded together continuously or a portion in which a number of the blocks of the polyimide component B are bonded together continuously.

There are no particular limitations on the polymerization and imidization in the step 2 according to the present invention as long as it can afford a di- or multi-block copolymer having a block of the polyimide component A and the polyimide component B that are bonded together at each end. Generally, the di- or multi-block copolymer can be suitably formed by allowing the polymerization and imidization to proceed until the number average molecular weight of the mixed solution of multi-component polyimide becomes increased preferably by two or more times and more preferably by five or more times. The mixed solution of multi-component polyimide obtained by the polymerization and imidization in the step 2 has a number average degree of polymerization of from 20 to 1,000, preferably from 20 to 500, and more preferably from 30 to 200. Too low number average degree of polymerization is not desirable, because the solution viscosity of the mixed solution becomes too low and the membrane preparation in the step 3 becomes difficult, and thus the mechanical strength of the resulting asymmetric membrane is lowered. Too high number average degree of polymerization is also not desirable, because the solution viscosity becomes too high and the membrane preparation in the step 3 becomes difficult. The solution viscosity (rotational viscosity) of the mixed solution of multi-component polyimide obtained in the step 2 is a feature required for making the solution in hollow-fiber form in the preparation of an asymmetric hollow-fiber membrane through the phase-inversion process and further for stabilizing the form thereof.

In the present invention, the solution viscosity of the mixed solution of multi-component polyimide is adjusted at from 20 to 17,000 poises at 100° C., preferably from 100 to 15,000 poises, and particularly preferably from 200 to 10,000 poises. The polyimide solution having such a solution viscosity as described above can stabilize the form of hollow-fibers after extrusion, when the polyimide solution is extruded through a nozzle in the spinning process of asymmetric hollow-fiber membranes. When the solution viscosity is lower than 20 poises or higher than 17,000 poises, it becomes difficult to obtain the form of hollow-fiber stably.

Note that, an adequate number average degree of polymerization and an adequate solution viscosity of the mixed solution of multi-component polyimide can be easily obtained by adjusting the composition ratio of the total number of mols of diamine with respect to the total number of mols of tetracarboxylic acid ((total number of mols of diamine)/(total number of mols of tetracarboxylic acid)) of the mixed solution of multi-component polyimide obtained in the step 1 at preferably from 0.95 to 0.99 or from 1.01 to 1.05 parts by mol, and more preferably from 0.96 to 0.99 or from 1.015 to 1.04 parts by mol, and by carrying out the polymerization and imidization in the step 2.

The polymer concentration of the mixed solutions of multi-component polyimide in the steps 1 and 2 is from 5 to 40 wt %, preferably from 8 to 30 wt %, and particularly preferably from 9 to 25 wt %. For the mixed solutions of multi-component polyimide in the steps 1 and 2, a polar organic solvent that dissolves uniformly the multi-component polyimide is suitably used. As the polar organic solvent, there may be used preferably, a polar organic solvent having a melting point of 200° C. or lower and preferably 150° C. or lower, for example, phenol, cresol, xylenol, catechols having two hydroxyl groups in a benzene ring such as catecohl and resorcinol; halogenated phenols such as 3-chlorophenol, 4-chlorophenol, 3-bromophenol, 4-bromophenol, and 2-chloro-5-hydroxytoluene; amides such as N-methyl-2-pyrrolidone, N,N-dimethylformamide, N,N-diethylformamide, N,N-dimethylacetoamide, and N,N-diethylacetoamide; and a mixed solvent thereof.

In the step 3, through the phase inversion process, an asymmetric hollow-fiber gas separation membrane is prepared from the mixed solution of multi-component polyimide obtained in the step 2. The phase inversion process is a known method in which a polymer solution is contacted to a coagulation liquid so as to form a membrane through phase inversion. In the present invention, the so-called dry and wet process is preferably applied. In the dry and wet process, the solvent on the surface of a polymer solution formed in a membrane form is evaporated so as to form a thin dense layer; and then the dense layer is immersed in a coagulation liquid (a solvent that is compatible with the solvent of the polymer solution, but the polymer is insoluble therein) so as to form a porous layer having micropores with the help of the phase separation effect accompanied with immersion. The dry and wet process has been proposed by Loeb et al. (for example, U.S. Pat. No. 3,133,132).

In the dry and wet spinning process, a polymer solution is extruded through a spinning nozzle to form a hollow-fiber; the hollow-fiber is passed through an air or a nitrogen gas atmosphere immediately after extruding; the hollow-fiber is immersed in a coagulation liquid that does not substantially dissolve the polymer component and has a compatibility with the solvent of the polymer solution so as to form an asymmetric structure through phase inversion; and then the hollow-fiber is dried and if necessary heat-treated to obtain a separation membrane.

It is desirable that the solution viscosity of the mixed solution of multi-component polyimide that is extruded through the nozzle is from 20 to 17,000 poises, preferably from 100 to 15,000 poises, and particularly preferably from 200 to 10,000 poises as described above at an extruding temperature (for example 100° C.), because the polyimide solution can be stably formed into a hollow-fiber or the other forms after extruding. The immersion in the coagulation liquid is desirably performed as follows: the membrane formed by extruding the solution is immersed in a primary coagulation liquid so as to coagulate the membrane to such an extent that the form of the membrane including a hollow-fiber and the other forms can be kept, and then the resulting membrane is taken up with a guide roll; after that, the membrane is immersed in a secondary coagulation liquid so as to coagulate the whole membrane sufficiently. As for the drying method of the coagulated membrane, drying after replacing the coagulation liquid with a solvent such as hydrocarbon is effective. The heat-treatment is optionally performed, and generally performed at a temperature (for example around 150 to 350° C.) lower than the softening temperature or the secondary transition temperature of each component polymer of the multicomponent polyimide used. However, in the present invention, the heat-treatment can be also performed at a temperature in the range of 350° C. to 450° C.

The asymmetric hollow-fiber gas separation membrane of the present invention is made of a polyimide having the repeating unit of the general formula (1) on average as a whole, and is obtained by the aforementioned production process. The membrane is a hollow-fiber membrane having an asymmetric structure mainly composed of an extremely thin dense layer (preferably from 0.001 to 5 μm thick) serving as a gas separation layer and a relatively thicker porous layer (preferably from 10 to 2,000 μm thick) that supports the dense layer, having an inside diameter of preferably from 10 to 3,000 μm and an outside diameter of preferably from approximately 30 to 7,000 μm. The membrane has a tensile strength at break of 3 kgf/mm$^2$ or more and preferably 4 kgf/mm$^2$ or more as a hollow-fiber membrane, particularly having such a mechanical strength that the tensile elongation at break is 15% or more and preferably 20% or more as a hollow-fiber.

Further, the asymmetric hollow-fiber gas separation membrane of the present invention has an oxygen gas permeation rate (P'$_{O2}$) of 4.0×10$^{-5}$ cm$^3$(STP)/cm$^2$·sec·cmHg or more, and preferably 5.0×10$^{-5}$ cm$^3$ (STP)/cm$^2$·sec·cmHg or more, and a ratio (P'$_{O2}$/P'$_{N2}$) of the permeation rate of oxygen to nitrogen gas of 4 or more, and more preferably 4.5 measured at 50° C.

As mentioned above, the asymmetric hollow-fiber gas separation membrane of the present invention possesses an excellent gas separation performance and an improved mechanical strength as well. The hollow-fiber membrane having such a mechanical strength, particularly having a tensile elongation at break of 15% or more, can be handled easily without failures and breaks, so that the hollow-fiber membrane can be fabricated into a module (assembled and processed into a gas separation membrane module) in an industrial process. Further, a gas separation membrane module using the hollow-fiber membranes having such a mechanical strength is particularly useful, because the module exhibits excellent resistance against pressure and durability. On the other hand, at less than 15% of tensile elongation at break, the hollow-fiber membranes are apt to make failures and breaks when they are assembled and processed into a gas separation membrane module, so that it is difficult to be assembled and processed into a separation membrane module in an industrial process. Further, such separation membrane module has a low resistance against pressure on use, so that the applications and the service conditions are limited. In particular, the hollow-fiber membranes in the separation membrane module receive deforming stress continuously or intermittently by the flow amount, speed, pressure, temperature of gases that are supplied, passed through the inside or outside of the hollow-fiber membranes and discharged, and their fluctuations, so that failures and breaks are apt to develop at a tensile elongation at break of 15% or less, and to cause problems in practical applications.

The asymmetric hollow-fiber gas separation membrane of the present invention has an excellent gas separation performance, particularly a separation performance between oxygen gas and nitrogen gas. When oxygen gas is separated from nitrogen gas (for example, in the case of separating nitrogen-enriched gas from the air), high-pressure mixed gas (the air) is supplied to the gas separation membrane module, so that the mechanical strength of the hollow-fiber membranes is an extremely significant property in practical use.

Therefore, the asymmetric hollow-fiber gas separation membrane of the present invention can be quite suitably used for separating oxygen gas from nitrogen gas. Namely, a mixed gas containing oxygen gas and nitrogen gas is contacted to the gas supply side of the asymmetric hollow-fiber gas separation membrane of the present invention so as to permeate selectively the oxygen gas to the gas permeation side of the asymmetric hollow-fiber gas separation membrane, whereby a mixed gas enriched with oxygen gas and a mixed gas enriched with nitrogen gas can be separated and recovered quite suitably from the mixed gas containing oxygen gas and nitrogen gas. Further, the asymmetric hollow-fiber gas separation membrane of the present invention has an excellent mechanical strength, so that by selecting the inside (the porous side) of the asymmetric hollow-fiber gas separation membrane as the gas supply side and the outside of the asymmetric hollow-fiber gas separation membrane as the gas permeation side, a mixed gas enriched with oxygen gas and a mixed gas enriched with nitrogen gas can be separated and recovered quite suitably from the mixed gas containing oxygen gas and nitrogen gas. This process provides a more efficient gas separation and recovery in many cases as compared with the process in which the outside of the asymmetric hollow-fiber gas separation membrane is selected as the gas feed side and the bore-side of the asymmetric hollow-fiber gas separation membrane is selected as the gas permeation side.

Here, there are no particular limitations on the separation conditions including temperature and pressure when oxygen gas is separated from nitrogen gas, and any separation condition used for conventional gas separation membranes can be applied, but preferably a mixed gas at a pressure of from 0.1 MPa G to 1.6 MPa G and a temperature of from −20° C. to 80° C. is supplied from a mixed gas inlet of the gas separation membrane module.

As mentioned above, the asymmetric hollow-fiber gas separation membrane of the present invention has an improved mechanical strength and an excellent gas separation performance as well. Even an asymmetric hollow-fiber gas separation membrane that is obtained by heat-treating the asymmetric hollow-fiber gas separation membrane at a maximum temperature in the range of 350° C. to 450° C. possesses a sufficient mechanical strength. In addition, the asymmetric hollow-fiber gas separation membrane obtained by heat-treating at a maximum temperature in the range of 350° C. to 450° C. can separate suitably a mixed gas containing organic compound vapor, and also has an adequate resistance against organic compounds. At a heat-treatment temperature lower than 350° C., an asymmetric hollow-fiber gas separation membrane that is suitably used to separate a mixed gas containing organic compound vapor cannot be obtained easily. When the heat-treatment temperature exceeds 450° C., the resulting asymmetric hollow-fiber gas separation membrane is not preferred, since the mechanical strength of the asymmetric hollow-fiber gas separation membrane is apt to be decreased.

The asymmetric hollow-fiber gas separation membrane of the present invention has an excellent mechanical strength, so that the membrane can be suitably used in a membrane module. The hollow-fiber gas separation membrane provides a large membrane area per module because of its hollow-fiber form, also a high-pressure mixed gas can be supplied to the membrane on gas separation, whereby a highly efficient gas separation can be attained. For example, a conventional gas separation module is fabricated as follows: approximately 100 to 100,000 tubes of hollow-fiber membranes having an appropriate length are bound together; at least one of both ends of the resulting hollow-fiber bundle is embedded and fixed into a tube plate made of a thermosetting resin and the like while each hollow-fiber membrane is kept to be opened; and then a resulting hollow-fiber membrane element composed of at least the hollow-fiber bundle and tube plate is accommodated in a vessel that is equipped with at least a mixed gas inlet, a permeated gas outlet, and a non-permeated gas outlet, in such a manner that the room connected to the bore-side of the hollow-fiber membranes is isolated from the room connected to the outside of the hollow-fiber membranes. In this gas separation membrane module, a mixed gas is fed from the mixed gas inlet to the inside of the hollow-fiber membranes (the bore-side) or the room adjacent to the outside; a specific gas component contained in the mixed gas is selectively permeated through the membrane while the mixed gas flows in contact with the hollow-fiber membranes; the permeated gas is discharged from the permeated gas outlet and the non-permeated gas that does not permeate through the membranes is discharged from the non-permeated gas outlet. In this way, gas separation is performed suitably.

Figure 2:
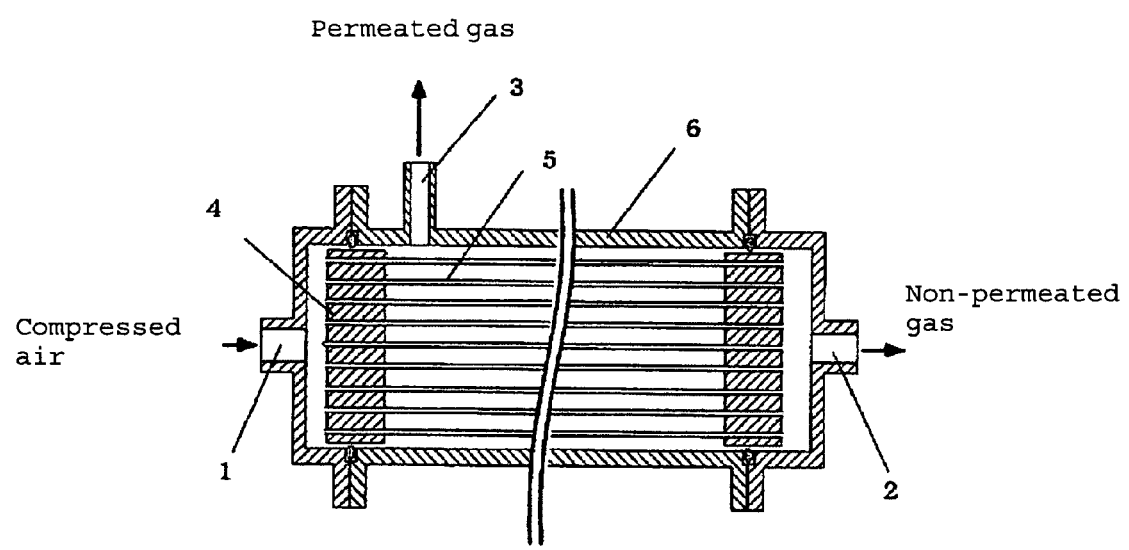
FIG. 2 shows a cross-section schematically illustrating a gas separation membrane module using the asymmetric hollow-fiber gas separation membrane of the present invention.

FIG. 2 shows schematically an exemplary embodiment of a gas separation membrane module using the asymmetric hollow-fiber gas separation membranes of the present invention and the method of use thereof. In FIG. 2, 1 is a mixed gas inlet, 2 is a non-permeated gas outlet, 3 is a permeated gas outlet, 4 is a tube plate, 5 is hollow-fiber membrane, and 6 is a vessel.

EXAMPLES

Measuring methods used in the present invention will be explained.

Measuring Method for Rotational Viscosity

The solution viscosity of a polyimide solution was measured with a rotational viscometer (at a shear velocity of 1.75 sec$^{-1}$) at 100° C.

Measurement for Polymerization Degree

In the present invention, the polymerization degree can be evaluated by preliminary estimate of the relation between the solution viscosity and the number averaged degree of polymerization by using of gel permeation chromatography (GPC) or measurement of the degree of imidization by IR spectroscopy, for example, and thereafter evaluating the number average degree of polymerization by measuring the solution viscosity of a reaction solution. A sample having 90% or higher imidization degree was measured with GPC. A sample having imidization degree of less than 90% was measured with IR spectroscopy.

In the present invention, GPC measurement was carried out as follows. "HPLC system 800 series" supplied by JASCO Corp. was used. A single column of "Shodex KD-806M" was used at a column temperature of 40° C. An intelligent UV/visual spectrometer (at an absorption wavelength of 350 nm) was used as a detector for an unknown sample. A differential refractometer was used as a detector for a reference material (polyethylene glycol was used as the reference material). An N-methyl-2-pyrrolidone solution containing lithium chloride and phosphoric acid each in 0.05 mol/L was used as a solvent. The flow rate of the solvent was 0.5 mL/min, and the sample concentration was approximately 0.1%. "JASCO-JMBS/BORWIN" was used to input and process the measurement data. Data were input at a frequency of 2 times/sec so as to obtain a chromatogram of the sample. On the other hand, as reference materials, polyethylene glycols having molecular weights of 82250, 28700, 6450, and 1900 were used, and a calibration curve providing the relation between the retention time and molecular weight was obtained by detecting peaks from the chromatogram of these samples. The molecular weight of an unknown sample was evaluated as follows: a molecular weight Mi for each retention time was obtained from the calibration curve; a fraction ($W_i$) of a chromatogram height ($h_i$) for each retention time with respect to the total chromatogram heights ($\Sigma h_i$), $W_i = h_i/\Sigma h_i$, was obtained; and the number average molecular weight (Mn) was obtained from $1/\{\Sigma(W_i/M_i)\}$, and the weight average molecular weight (Mw) was obtained from $\Sigma(W_i \cdot M_i)$.

The number average degree of polymerization (N) was obtained by dividing the number averaged molecular weight (Mn) by the monomer unit molecular weight ($<m>$) that was averaged for the charged ratio of each monomer component on polymerization.

$$N = Mn/<m>$$

Here, the monomer unit molecular weight ($<m>$) was obtained as follows. Namely, in the case of charging plural kinds of tetracarboxylic acids (molecular weight: $m_{1,i}$, charged mol ratio: $R_{1,i}$, wherein $\Sigma R_{1,i} = 1$ and $i = 1, 2, 3, \ldots, n_1$) and plural kinds of diamines (molecular weight: $m_{2,j}$, charged mol ratio: $R_{2,j}$, wherein $\Sigma R_{2,j} = 1$ and $j = 1, 2, 3, \ldots, n_2$), the monomer unit molecular weight ($<m>$) was obtained in accordance with the following equation.

$$<m> = (\Sigma R_{1,i} m_{1,i} + \Sigma R_{2,j} m_{2,j}) - 36$$

Measurement for Degree of Imidization

The measurement for degree of imidization by IR spectroscopy was carried out using "Spectrum One" supplied by PerkinElmer Corp., by way of attenuated total reflection-Fourier transform infrared spectroscopy (ATR-FTIR). The degree of imidization ($p_I$) was obtained by dividing $A/A_I$ by $A_S/A_{SI}$, wherein $A/A_I$ is a normalized value of an absorbance (A) that corresponds to the C—N stretching vibration of imide bonding at a wavenumber of approximately 1360 cm$^{-1}$ using the absorbance ($A_I$) that corresponds to the C=C in-plane vibration of aromatic ring at a wavenumber of approximately 1500 cm$^{-1}$ as an internal standard; and $A_S/A_{SI}$ is a normalized value of an absorbance (As) that corresponds to the C—N stretching vibration obtained in the same manner as described above for a sample obtained after 5 hour heat-treatment at 190° C., using an absorbance ($A_{SI}$) that corresponds to the C=C in-plane vibration of aromatic ring as an internal standard.

$$p_I = (A/A_I)/(A_S/A_{SI})$$

Here, the absorbance for an absorption band was evaluated by the peak intensity that was measured from the baseline connecting the bottoms on both sides of the absorption band.

By using the degree of imidization obtained above, the number averaged degree of polymerization (N) was calculated from the following equation.

$$N = (1+r)/(2r(1-p_I) + (1-r))$$

Here, r is the composition ratio of the total mols of the diamines with respect to the total mols of the tetracarboxylic acids in polyimide. In the case where the total mols of the diamine are larger than those of the tetracarboxylic acids, r is the inversed value of the resulting composition ratio, that is, r is equal to or smaller than 1 in any case. $p_I$ is the degree of imidization.

Measuring Method for Oxygen Gas and Nitrogen Gas Permeabilities

An element that was used for the permeability evaluation and had an effective length of 8 cm was fabricated by using six tubes of hollow-fiber membranes, a stainless-steel pipe, and an epoxy resin adhesive. The element was housed in a stainless-steel vessel to obtain a pensile module. To the pensile module, a standard mixed gas containing helium, oxygen, and nitrogen (30:30:40 by volume) was supplied at a constant pressure so as to measure the amount and composition of a permeated gas. The composition was evaluated by gas chromatography. The oxygen gas and nitrogen gas permeation rates were calculated from the amount and composition of the permeated gas, the pressure at which the mixed gas was supplied, and the effective membrane area. The measurement was carried out at 50° C.

Measuring Method for Organic Compound Vapor Permeability of Hollow-Fiber Membranes Fabrication of hollow-fiber membrane element for evaluation:

Ten tubes of hollow-fiber membranes were bound together and cut to form a hollow-fiber membrane bundle; one of the ends of the hollow-fiber membrane bundle was fixed with an epoxy resin while the end was opened; and then the other end thereof was fixed and closed with an epoxy resin so as to obtain a hollow-fiber membrane element that was used for evaluation and had an effective length of hollow-fiber membrane of 7.5 cm and an effective membrane area of 9.4 cm².

Figure 3:
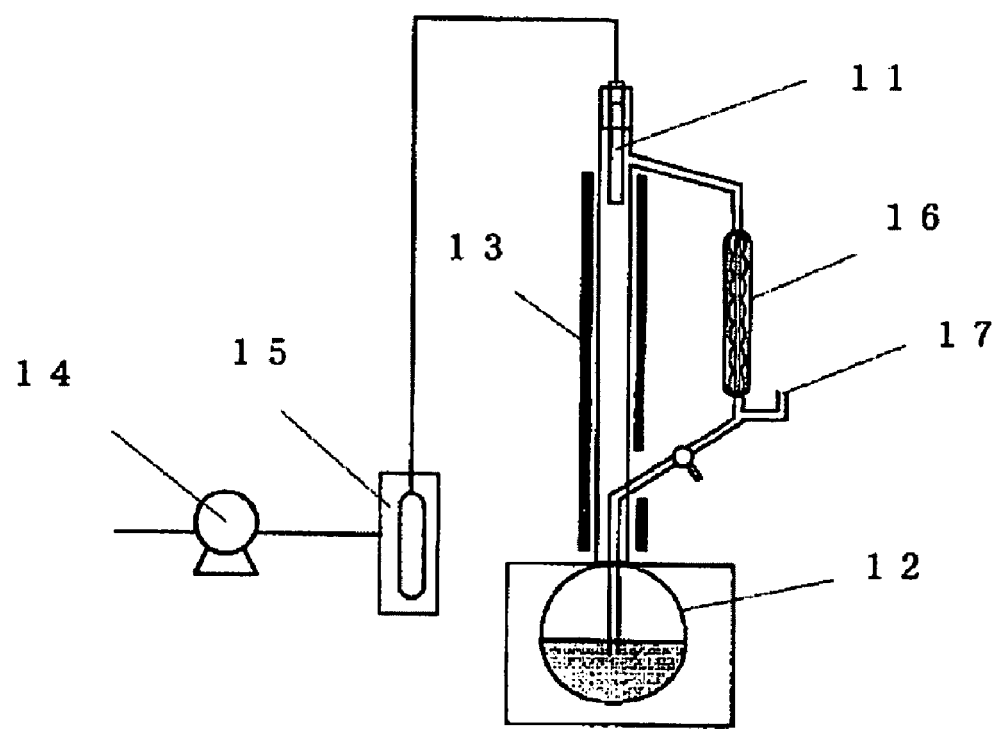
FIG. 3 shows a schematic illustration of an apparatus used for evaluating the gas separation performance for organic compound gases.

Measurement for Gas Separation Performance:

The measurement for gas separation performance is explained with a schematic illustration of an apparatus for evaluating gas separation performance shown in FIG. 3. In a flask 12 equipped with a heating device, methanol (hereinafter, abbreviated as MeOH in some cases) and dimethylcarbonate (hereinafter, abbreviated as DMC in some cases) were charged in a predetermined mol ratio in such a manner that the resulting mixed vapor of methanol and dimethylcarbonate has the mol ratio approximately equal to an azeotropic composition (methanol:dimethylcarbonate=7:3); they were heated to generate a mixed organic vapor, that was then superheated with a super-heating device 13 to obtain a 120° C. mixed organic vapor having an atmospheric pressure; and then the mixed organic vapor was cooled and liquefied with a cooling device 16 so as to be circulated back to the flask 12. In the course of the above circulation process, the hollow-fiber membrane element for evaluation was not incorporated in the aforementioned apparatus. The incorporated part was closed. After preparation of the mixed organic vapor was continued for two hours or longer, the mol ratio of methanol and dimethylcarbonate in the mixed organic vapor was analyzed and confirmed to be the aforementioned azeotropic composition. After that, as shown in FIG. 3, a hollow fiber membrane element for evaluation 11 was incorporated into the apparatus for evaluating gas separation performance. The gas permeated side (bore-side) of the hollow-fiber membranes of the element was kept at a reduced pressure of 0.0007 MPa with a vacuum pump 14 so as to start gas separation. After 30 minutes or more of running-in, the permeated gas obtained from the gas permeated side of the hollow-fiber membrane element for evaluation 11 was introduced into a dry ice/methanol trap 15 for 30 minutes so as to collect the permeated gas as a condensate. The collected condensate was weighed and the concentration of each component was measured by gas chromatography so as to obtain the amount of each component contained in the permeated organic vapor. From each organic vapor component thus obtained, the permeation rate of each organic vapor component and the ratio of permeation rate were calculated. Here, sufficient amounts of methanol and dimethylcarbonate were charged, so that their mixing ratio was kept constant substantially during the measurement. In FIG. 3, 14 is the vacuum pump and 17 is an open end of a branched pipe.

Measurement for Tensile Strength and Elongation at Break of Hollow-Fiber Membranes The tensile strength and elongation at break were measured at an effective length of 20 mm and a elongation speed of 10 mm/min with a tensile testing machine. The measurement was performed at 23° C. The cross-sectional area of the hollow fibers was obtained by observing the cross-section of the hollow-fiber with an optical microscope and the dimension was measured from optical microscope image.

Evaluation Method for Solvent Resistance (Resistance Against Organic Compounds)

After the whole body of one hollow-fiber membrane cut into 2 cm long was fully immersed and kept for 1 hour in 20 ml of para-chlorophenol kept at 80° C., the hollow-fiber membrane was taken out and the length thereof was measured. The value obtained by dividing 2 cm of the original length by the length after immersion and multiplied by 100 was selected as an index of solvent resistance.

The method for producing the asymmetric hollow-fiber membranes of the present examples is explained.

Method for Producing Asymmetric Hollow-Fiber Membranes

The asymmetric hollow-fiber membranes used in the following examples were produced by the dry and wet spinning process. Specifically, a polyimide solution was filtered off with a 400 mesh pass-through net; the filtered solution was extruded through a hollow-fiber spinning nozzle (having a circular opening with an outside diameter of 1,000 μm and a slit width of 200 μm, and a core opening with an outside diameter of 400 μm); the extruded solution in a hollow-fiber form was passed through a nitrogen gas atmosphere, and then immersed in a coagulation liquid of a 75 wt % ethanol aqueous solution kept at 0° C. to obtain a wet fiber. The fiber was immersed in 50° C. ethanol for 2 hours to complete desolvation, and further immersed and cleaned in 70° C. isooctane for 3 hours to replace the solvent, and then dried at 100° C. for 30 minutes under an absolute dry condition. After that, in Examples 1 to 8, the fiber was heat-treated at 250 to 350° C. for 1 hour. In Examples 9 and 10, the asymmetric hollow-fiber membrane obtained after the above 1 hour heat-treatment at 250 to 350° C. was further heat-treated at 370° C. or 400° C. for 1 hour. Further, in order to condition the surface sliding property of the hollow-fiber membrane, the hollow-fiber was subjected to oil treatment with silicone oil. In this way, a hollow-fiber membrane was produced. The resulting hollow-fiber membranes, each had roughly an outside diameter of 400 μm, an inside diameter of 200 μm, and a membrane thickness of 100 μm.

Example 1

In a separable flask, 8.21 g of 3,3',4,4'-biphenyltetracarboxylic acid dianhydride (hereinafter, abbreviated as s-BPDA in some cases), 11.02 g of 2,2'-bis(3,4-dicarboxyphenyl) hexafluoropropane dianhydride (hereinafter, abbreviated as 6FDA in some cases), 7.37 g of dimethyl-3,7-di-amino-dibenzothiophene-5,5-dioxide (hereinafter, abbreviated as TSN in some cases), and 8.65 g of 3,3'-5,5'-tetrachloro-4,4'-diaminodiphenyl (hereinafter, abbreviated as TCB in some cases) (1.020 parts by mol of diamine with respect to 1 part by mol of acid dianhydride.) were polymerized in the presence of 163 g of PCP serving as a solvent at 190° C. for 20 hours to obtain a polyimide solution, which had a polyimide polymerization degree of 44. To the polyimide solution, 2.03 g of pyromellitic acid dianhydride (hereinafter, abbreviated as PMDA in some cases), 1.30 g of TSN, and 1.53 g of TCB were added with 22 g of PCP serving as a solvent. The resulting mixed solution of multi-component polyimide was further polymerized and imidized at 190° C. for 18 hours to obtain a polyimide solution having a polyimide polymerization degree of 65, a rotational viscosity of 2511 poises, and a polymer concentration of 17 wt %. (The total source material composition: diamine was 1.020 parts by mol with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $6.82 \times 10^{-5}$ $cm^3(STP)/cm^2 \cdot sec \cdot cmHg$, a nitrogen gas permeation rate of $1.37 \times 10^{-5}$ $cm_3(STP)/cm_2 \cdot sec \cdot cmHg$, and a ratio of permeation rate of oxygen to nitrogen gas of 5.0. Further, the membrane had a tensile strength of 6 $kgf/mm^2$ and a tensile elongation at break of 30%.

Comparative Example 1

In a separable flask, 8.21 g of s-BPDA, 11.02 g of 6FDA, 2.03 g of PMDA, 8.62 g of TSN, and 10.12 g of TCB were polymerized in the presence of 184 g of PCP serving as a solvent at 190° C. for 18 hours to obtain a polyimide solution, which had a polymerization degree of 93, a rotational viscosity of 2251 poises, and a polymer concentration of 17 wt %. (composition: 1.0135 parts by mol of diamine with respect to 1 part by mol of acid dianhydride.)

This polyimide solution was obtained by randomly polymerizing the source material composition having basically the same composition as used in Example 1, except that the mol ratio of diamine to acid dianhydride was slightly different.

A hollow-fiber membrane was produced from the polyimide solution in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $4.86 \times 10^{-5}$ $cm^3(STP)/cm^2 \cdot sec \cdot cmHg$, a nitrogen gas permeation rate of $0.92 \times 10^{-5}$ $cm^3(STP)/cm^2 \cdot sec \cdot cmHg$, and a ratio of permeation rate of oxygen to nitrogen gas of 5.3. Further, the membrane had a tensile strength of 6 $kgf/mm^2$ and a tensile elongation at break of 8%.

Example 2

In a separable flask, 9.12 g of s-BPDA, 11.02 g of 6FDA, 7.81 g of TSN, and 9.16 g of TCB were polymerized in the presence of 172 g of PCP serving as a solvent at 190° C. for 20 hours to obtain a polyimide solution, which had a polyimide polymerization degree of 57. To the polyimide solution, 1.35 g of PMDA, 0.87 g of TSN, and 1.02 g of TCB were added with 14 g of PCP serving as a solvent. The resulting mixed solution of multi-component polyimide was further polymerized and imidized at 190° C. for 18 hours to obtain a polyimide solution having a polyimide polymerization degree of 63, a rotational viscosity of 1953 poises, and a polymer concentration of 17 wt %. (The total source material composition: 1.020 parts by mol of diamine with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $5.55 \times 10^{-5}$ $cm^3(STP)/cm^2 \cdot sec \cdot cmHg$, a nitrogen gas permeation rate of $1.12 \times 10^{-5}$ $cm^3(STP)/cm^2 \cdot sec \cdot cmHg$, and a ratio of permeation rate of oxygen to nitrogen gas of 5.0. Further, the membrane had a tensile strength of 6 $kgf/mm^2$ and a tensile elongation at break of 17%.

Example 3

In a separable flask, 8.21 g of s-BPDA, 2.03 g of PMDA, 5.20 g of TSN, and 6.11 g of TCB were polymerized in the presence of 99 g of PCP serving as a solvent at 190° C. for 17 hours to obtain a polyimide solution, which had a polyimide polymerization degree of 88. To the polyimide solution, 11.02 g of 6FDA, 3.47 g of TSN, and 4.07 g of TCB were added with 86 g of PCP serving as a solvent. The resulting mixed solution of multi-component polyimide was further polymerized and imidized at 190° C. for 12 hours to obtain a polyimide solution having a polyimide polymerization degree of 69, a rotational viscosity of 1600 poises, and a polymer concentration of 17 wt %. (The total source material composition: 1.020 parts by mol of diamine with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were measured in accordance with the aforementioned methods.

The hollow-fiber membrane had an oxygen gas permeation rate of $6.59 \times 10^{-5}$ $cm^3(STP)/cm^2 \cdot sec \cdot cmHg$, a nitrogen gas permeation rate of $1.27 \times 10^{-5}$ $cm^3(STP)/cm^2 \cdot sec \cdot cmHg$, and a ratio of permeation rate of oxygen to nitrogen gas of 5.2. Further, the membrane had a tensile strength of 6 $kgf/mm^2$ and a tensile elongation at break of 24%.

Example 4

In a separable flask, 10.94 g of s-BPDA, 5.20 g of TSN, and 6.11 g of TCB were polymerized in the presence of 102 g of PCP serving as a solvent at 190° C. for 20 hours to obtain a polyimide solution, which had a polyimide polymerization degree of 77. To the polyimide solution, 11.02 g of 6FDA, 3.47 g of TSN, and 4.07 g of TCB were added with 86 g of PCP serving as a solvent. The resulting mixed solution of multi-component polyimide was further polymerized and imidized at 190° C. for 20 hours to obtain a polyimide solution having a polyimide polymerization degree of 76, a rotational viscosity of 2009 poises, and a polymer concentration of 17 wt %. (The total source material composition: 1.020 parts by mol of diamine with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were measured in accordance with the aforementioned methods.

The hollow-fiber membrane had an oxygen gas permeation rate of $7.63 \times 10^{-5}$ cm$^3$(STP)/cm$^2$·sec·cmHg, a nitrogen gas permeation rate of $1.55 \times 10^{-5}$ cm$^3$(STP)/cm$^2$·sec·cmHg, and a ratio of permeation rate of oxygen to nitrogen gas of 4.9. Further, the membrane had a tensile strength of 5 kgf/mm$^2$ and a tensile elongation at break of 16%.

Comparative Example 2

In a separable flask, 10.94 g of s-BPDA, 11.02 g of 6FDA, 8.67 g of TSN, and 10.18 g of TCB were polymerized in the presence of 188 g of PCP serving as a solvent at 190° C. for 29 hours to obtain a polyimide solution, which had a polyimide polymerization degree of 55, a rotational viscosity of 1209 poises, and a polymer concentration of 17 wt %. (1.020 parts by mol of diamine with respect to 1 part by mol of acid dianhydride.)

This polyimide solution was obtained by randomly polymerizing the source material composition having basically the same ratio as used in Example 4.

A hollow-fiber membrane was produced from the polyimide solution in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $4.18 \times 10^{-5}$ cm$^3$(STP)/cm$^2$·sec·cmHg, a nitrogen gas permeation rate of $0.88 \times 10^{-5}$ cm$^3$(STP)/cm$^2$·sec·cmHg, and a ratio of permeation rate of oxygen to nitrogen gas of 4.8. Further, the membrane had a tensile strength of 5 kgf/mm$^2$ and a tensile elongation at break of 6%.

Example 5

In a separable flask, 11.02 g of 6FDA, 3.47 g of TSN, and 4.07 g of TCB were polymerized in the presence of 86 g of PCP serving as a solvent at 190° C. for 35 hours to obtain a polyimide solution, which had a polyimide polymerization degree of 42. To the polyimide solution, 8.21 g of s-BPDA, 2.03 g of PMDA, 5.20 g of TSN, and 6.11 g of TCB were added with 99 g of PCP serving as a solvent. The resulting mixed solution of multi-component polyimide was further polymerized and imidized at 190° C. for 25 hours to obtain a polyimide solution having a polyimide polymerization degree of 59, a rotational viscosity of 2120 poises, and a polymer concentration of 17 wt %. (The total source material composition: diamine was 1.020 parts by mol with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $5.48 \times 10^{-5}$ cm$^3$(STP)/cm$^2$·sec·cmHg, a nitrogen gas permeation rate of $1.09 \times 10^{-5}$ cm$^3$(STP)/cm$^2$·sec·cmHg, and a ratio of permeation rate of oxygen to nitrogen gas of 5.0. Further, the membrane had a tensile strength of 7 kgf/mm$^2$ and a tensile elongation at break of 40%.

Comparative Example 3

In a separable flask, 8.21 g of s-BPDA, 6.89 g of 6FDA, 6.07 g of TSN, and 7.13 g of TCB were polymerized in the presence of 129 g of PCP serving as a solvent at 190° C. for 20 hours to obtain a polyimide solution, which had a polyimide polymerization degree of 53. To the polyimide solution, 4.13 g of 6FDA, 2.03 g of PMDA, 2.60 g of TSN, and 3.05 g of TCB were added with 56 g of PCP serving as a solvent. The resulting mixed solution of multi-component polyimide was further polymerized and imidized at 190° C. for 20 hours to obtain a polyimide solution having a polyimide polymerization degree of 61, a rotational viscosity of 1116 poises, and a polymer concentration of 17 wt %. (The total source material composition: diamine was 1.020 parts by mol with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were measured in accordance with the aforementioned methods.

The hollow-fiber membrane had an oxygen gas permeation rate of $5.13 \times 10^{-5}$ cm$^3$(STP)/cm$^2$·sec·cmHg, a nitrogen gas permeation rate of $1.00 \times 10^{-5}$ cm$^3$(STP)/cm$^2$·sec·cmHg, and a ratio of permeation rate of oxygen to nitrogen gas of 5.1. Further, the membrane had a tensile strength of 6 kgf/mm$^2$ and a tensile elongation at break of 8%.

Example 6

In a separable flask, 11.02 g of 6FDA, 3.47 g of TSN, and 4.07 g of TCB were polymerized in the presence of 86 g of PCP serving as a solvent at 190° C. for 35 hours to obtain a polyimide solution, which had a polyimide polymerization degree of 13. To the polyimide solution, 10.94 g of s-BPDA, 5.20 g of TSN, and 6.11 g of TCB were added with 102 g of PCP serving as a solvent. The resulting mixed solution of multi-component polyimide was further polymerized and imidized at 190° C. for 38 hours to obtain a polyimide solution having a polyimide polymerization degree of 31, a rotational viscosity of 1395 poises, and a polymer concentration of 17 wt %. (The total source material composition: diamine was 1.020 parts by mol with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $5.53 \times 10^{-5}$ cm$^3$(STP)/cm$^2$·sec·cmHg, a nitrogen gas permeation rate of $1.02 \times 10^{-5}$ cm$^3$(STP)/cm$^2$·sec·cmHg, and a ratio of permeation rate of oxygen to nitrogen gas of 5.4. Further, the membrane had a tensile strength of 6 kgf/mm$^2$ and a tensile elongation at break of 25%.

Example 7

In a separable flask, 2.74 g of s-BPDA, 2.03 g of PDMA, 2.60 g of TSN, and 3.05 g of TCB were polymerized in the presence of 48 g of PCP serving as a solvent at 190° C. for 20 hours to obtain a polyimide solution, which had a polyimide polymerization degree of 35. To the polyimide solution, 11.02 g of 6FDA, 5.47 g of s-BPDA, 6.07 g of TSN, and 7.13 g of TCB were added with 137 g of PCP serving as a solvent. The resulting mixed solution of multi-component polyimide was further polymerized and imidized at 190° C. for 24 hours to obtain a polyimide solution having a polyimide polymerization degree of 42, a rotational viscosity of 1897 poises, and a polymer concentration of 17 wt %. (The total source material composition: diamine was 1.020 parts by mol with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $7.19 \times 10^{-5}$ cm$^3$(STP)/cm$^2$·sec·cmHg, a nitrogen gas permeation rate of $1.47 \times 10^{-5}$ cm$^3$(STP)/cm$^2$·sec·cmHg, and a ratio of permeation rate of oxygen to nitrogen gas of 4.9. Further, the membrane had a tensile strength of 7 kgf/mm$^2$ and a tensile elongation at break of 39%.

Example 8

In a separable flask, 11.02 g of 6FDA, 5.47 g of s-BPDA, 6.07 g of TSN, and 7.13 g of TCB were polymerized in the presence of 137 g of PCP serving as a solvent at 190° C. for 20 hours to obtain a polyimide solution, which had a polyimide polymerization degree of 21. To the polyimide solution, 2.74 g of s-BPDA, 2.03 g of PMDA, 2.60 g of TSN, and 3.05 g of TCB were added with 48 g of PCP serving as a solvent. The resulting mixed solution of multi-component polyimide was further polymerized and imidized at 190° C. for 32 hours to obtain a polyimide solution having a polyimide polymerization degree of 27, a rotational viscosity of 1469 poises, and a polymer concentration of 17 wt %. (The total source material composition: diamine was 1.020 parts by mol with respect to 1 part by mol of acid dianhydride.)

A hollow-fiber membrane was produced from the mixed solution of multi-component polyimide in accordance with the aforementioned method for producing an asymmetric hollow-fiber membrane. The gas permeability and mechanical properties of the resulting hollow-fiber membrane were evaluated in accordance with the aforementioned methods.

The hollow-fiber membrane had an oxygen gas permeation rate of $8.38 \times 10^{-5}$ cm$^3$(STP)/cm$^2$·sec·cmHg, a nitrogen gas permeation rate of $1.73 \times 10^{-5}$ cm$^3$(STP)/cm$^2$·sec·cmHg, and a ratio of permeation rate of oxygen to nitrogen gas of 4.8. Further, the membrane had a tensile strength of 6 kgf/mm$^2$ and a tensile elongation at break of 27%.

Example 9

The asymmetric hollow-fiber membrane obtained in Example 8 was further heat-treated at 370° C. for 1 hour. The gas permeability, mechanical properties, and solvent resistance of the resulting hollow-fiber membrane were evaluated in accordance with the aforementioned methods.

The hollow-fiber membrane had an oxygen gas permeation rate of $1.80 \times 10^{-5}$ cm$^3$(STP) cm$^2$·sec·cmHg, a nitrogen gas permeation rate of $3.40 \times 10^{-6}$ cm$^3$(STP)/cm$^2$·sec·cmHg, and a ratio of permeation rate of oxygen to nitrogen gas of 5.3. The MeOH gas permeation rate was $20.6 \times 10^{-5}$ cm$^3$(STP)/cm$^2$·sec·cmHg. The DMC gas permeation rate was $2.4 \times 10^{-5}$ cm$^3$(STP)/cm$^2$·sec·cmHg. The ratio of permeation rate of MeOH to DMC gas was 8.6. Further, the membrane had a tensile strength of 9 kgf/mm$^2$, a tensile elongation at break of 34%, and a solvent resistance index of 83%.

Comparative Example 4

The asymmetric hollow-fiber membrane obtained in Comparative Example 1 was further heat-treated at 370° C. for 1 hour. The gas permeability, mechanical properties, and solvent resistance of the resulting hollow-fiber membrane were evaluated in accordance with the aforementioned methods.

The hollow-fiber membrane had an oxygen gas permeation rate of $5.15 \times 10^{-5}$ cm$^3$(STP)/cm$^2$·sec·cmHg, a nitrogen gas permeation rate of $1.13 \times 10^{-5}$ cm$^3$(STP)/cm$^2$·sec·cmHg, and a ratio of permeation rate of oxygen to nitrogen gas of 4.6. The MeOH gas permeation rate was $28.9 \times 10^{-5}$ cm$^3$(STP)/cm$^2$·sec·cmHg. The DMC gas permeation rate was $3.5 \times 10^{-5}$ cm$^3$(STP)/cm$^2$·sec·cmHg. The ratio of permeation rate of MeOH to DMC gas was 8.3. Further, the membrane had a tensile strength of 5.7 kgf/mm$^2$, a tensile elongation at break of 5.3%, and a solvent resistance index of 80%.

Example 10

The asymmetric hollow-fiber membrane obtained in Example 8 was further heat-treated at 400° C. for 1 hour. The gas permeability, mechanical properties, and solvent resistance of the resulting hollow-fiber membrane were evaluated in accordance with the aforementioned methods.

The hollow-fiber membrane had an oxygen gas permeation rate of $1.01 \times 10^{-5}$ cm$^3$(STP)/cm$^2$·sec·cmHg, a nitrogen gas permeation rate of $1.99 \times 10^{-6}$ cm$^3$(STP)/cm$^2$·sec·cmHg, and a ratio of permeation rate of oxygen to nitrogen gas of 5.1. The MeOH gas permeation rate was $16.9 \times 10^{-5}$ cm$^3$(STP)/cm$^2$·sec·cmHg. The DMC gas permeation rate was $1.9 \times 10^{-5}$ cm$^3$(STP)/cm$^2$·sec·cmHg. The ratio of permeation rate of MeOH to DMC gas was 8.9. Further, the membrane had a tensile strength of 13.0 kgf/mm$^2$, a tensile elongation at break of 23%, and a solvent resistance index of 95%.

Comparative Example 5

The asymmetric hollow-fiber membrane obtained in Comparative Example 1 was further heat-treated at 400° C. for 1 hour. The gas permeability, mechanical properties, and solvent resistance of the resulting hollow-fiber membrane were evaluated in accordance with the aforementioned methods.

The hollow-fiber membrane had an oxygen gas permeation rate of $4.33 \times 10^{-5}$ cm$^3$(STP)/cm$^2$·sec·cmHg, a nitrogen gas permeation rate of $1.45 \times 10^{-5}$ cm$^3$(STP)/cm$^2$·sec·cmHg, and a ratio of permeation rate of oxygen to nitrogen gas of 3.0. The MeOH gas permeation rate was $25.7 \times 10^{-5}$ cm$^3$(STP)/cm$^2$·sec·cmHg. The DMC gas permeation rate was $2.6 \times 10^{-5}$ cm$^3$(STP)/cm$^2$·sec·cmHg. The ratio of permeation rate of MeOH to DMC gas was 9.9. Further, the membrane had a tensile strength of 15.0 kgf/mm$^2$, a tensile elongation at break of 7.0%, and a solvent resistance index of 90%.

The present invention provides an asymmetric hollow-fiber membrane that is made of a specific polyimide and has improved mechanical strength without lowering largely gas separation performance. The present invention also provides a gas separation method of selectively permeating and separating oxygen gas from a mixed gas containing oxygen gas and nitrogen gas by using the asymmetric hollow-fiber gas separation membrane.

Further the present invention can provide an asymmetric hollow-fiber gas separation membrane having sufficient mechanical strength even after heat-treatment at high temperatures. The asymmetric hollow-fiber gas separation membrane after the heat-treatment can be suitably used for the separation of a mixed gas containing organic compound vapor.

What is claimed is:

1. An asymmetric hollow-fiber gas separation membrane comprising a polyimide, and having an improved tensile elongation at break of 15% or more as a hollow-fiber membrane itself, the polyimide comprising a repeating unit substantially represented by the following general formula (1):

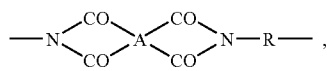

general formula (1)

wherein, 20 to 80 mol % of A is a tetravalent unit based on the biphenyl structure represented by the formula (2),

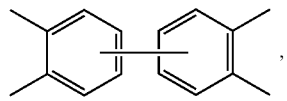

formula (2)

20 to 80 mol % of A is a tetravalent unit based on the diphenylhexafluoropropane represented by the formula (3),

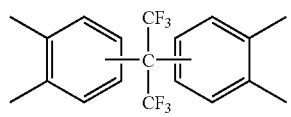

formula (3)

0 to 30 mol % of A is a tetravalent unit based on the phenyl structure represented by the formula (4),

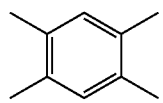

formula (4)

30 to 70 mol % of R is a divalent unit represented by the formula (5) and/or formula (6),

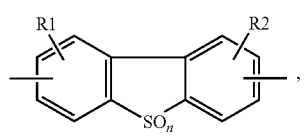

formula (5)

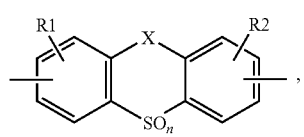

formula (6)

wherein, in formula (5), each of R1 and R2 is a hydrogen atom or organic group, and n is any number of 0, 1 and 2, and in formula (6), each of R1 and R2 is a hydrogen atom or organic group, and X is —$CH_2$— or —CO—, and 30 to 70 mol % of R is a divalent unit based on the biphenyl structure represented by the formula (7),

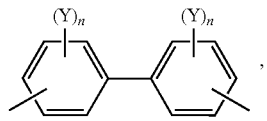

formula (7)

wherein, in formula (7), Y is a chlorine or bromine atom, and n is any number of 1 to 3.

2. The asymmetric hollow-fiber gas separation membrane according to claim 1, having an oxygen gas permeation rate $P'_{O2}$ of $4.0 \times 10^{-5}$ $cm^3(STP)/cm^2 \cdot sec \cdot cmHg$ or more and a gas ratio of permeation rate of oxygen to nitrogen $P'_{O2}/P'_{N2}$ of 4 or more that are measured at 50° C.

3. A gas separation method comprising:
contacting a mixed gas containing oxygen gas and nitrogen gas to a gas supply side of the asymmetric hollow-fiber gas separation membrane according to claim 1,
selectively permeating the oxygen gas to a gas permeation side of the asymmetric hollow-fiber gas separation membrane, and
separating and recovering an oxygen-enriched mixed gas and a nitrogen-enriched mixed gas from the mixed gas.

4. The gas separation method according to claim 3, wherein a bore-side of the asymmetric hollow-fiber gas separation membrane is selected as the gas supply side and the outside of the asymmetric hollow-fiber gas separation membrane is selected as the gas permeation side.

5. A hollow-fiber gas separation membrane module comprising:
a hollow-fiber element essentially comprising a hollow-fiber bundle formed by binding a number of the asymmetric hollow-fiber gas separation membranes according to claim 1, the hollow-fiber element accommodated in a vessel in such a manner that a bore-side space of the asymmetric hollow fiber gas separation membrane is isolated from an outside room of the membrane, and
a tube plate embedding and fixing at least one end of the hollow-fiber bundle while each end is opened,
the vessel having an inlet for mixed gas, an outlet for non-permeated gas, and an outlet for permeated gas.

6. An asymmetric hollow-fiber gas separation membrane obtained by heating the asymmetric hollow-fiber gas separation membrane according to claim 1 at a maximum temperature in the range of 350° C. to 450° C.

7. A gas separation method comprising:
contacting a mixed gas enriched with an organic compound vapor to a gas supply side of the asymmetric hollow-fiber gas separation membrane according to claim 6,
permeating selectively the organic compound vapor to a gas permeation side of the asymmetric hollow-fiber gas separation membrane, and
separating and recovering the mixed gas enriched with an organic compound vapor.

8. A hollow-fiber gas separation membrane module comprising:
a hollow-fiber element essentially comprising a hollow-fiber bundle formed by binding a number of the asymmetric hollow-fiber gas separation membranes according to claim 6, the hollow-fiber element accommodated in a vessel in such a manner that a bore-side space of the asymmetric hollow-fiber gas separation membranes is isolated from an outside room of the membrane, and a tube plate embedding and fixing at least one end of the hollow-fiber bundle while each end is opened, the vessel having an inlet for mixed gas, an outlet for non-permeated gas, and an outlet for permeated gas.

9. A gas separation method comprising:

contacting a mixed gas containing oxygen gas and nitrogen gas to a gas supply side of the asymmetric hollow-fiber gas separation membrane according to claim 2, selectively permeating the oxygen gas to a gas permeation side of the asymmetric hollow-fiber gas separation membrane, and separating and recovering an oxygen-enriched mixed gas and a nitrogen-enriched mixed gas from the mixed gas.

10. The gas separation method according to claim 9, wherein a bore-side of the asymmetric hollow-fiber gas separation membrane is selected as the gas supply side and the outside of the asymmetric hollow-fiber gas separation membrane is selected as the gas permeation side.

11. A hollow-fiber gas separation membrane module comprising:

a hollow-fiber element essentially comprising a hollow-fiber bundle formed by binding a number of the asymmetric hollow-fiber gas separation membranes according to claim 2, the hollow-fiber element accommodated in a vessel in such a manner that a bore-side space of the asymmetric hollow-fiber gas separation membranes is isolated from an outside room of the membranes, and a tube plate embedding and fixing at least one end of the hollow-fiber bundle while each end is opened, the vessel having an inlet for mixed gas, an outlet for non-permeated gas, and an outlet for permeated gas.

12. An asymmetric hollow-fiber gas separation membrane obtained by heating the asymmetric hollow-fiber gas separation membrane according to claim 2 at a maximum temperature in the range of 350° C. to 450° C.

13. A gas separation method comprising:

contacting a mixed gas containing an organic compound vapor to the gas supply side of the asymmetric hollow-fiber gas separation membrane according to claim 12, permeating selectively the organic compound vapor to a gas permeation side of the asymmetric hollow-fiber gas separation membrane, and separating and recovering the mixed gas enriched with an organic compound vapor.

14. A hollow-fiber gas separation membrane module comprising:

a hollow-fiber element essentially comprising a hollow-fiber bundle formed by binding a number of the asymmetric hollow-fiber gas separation membranes according to claim 12, the hollow-fiber element accommodated in a vessel in such a manner that a bore-side space of the asymmetric hollow-fiber gas separation membranes is isolated from the outside room thereof, and a tube plate embedding and fixing at least one end of the hollow-fiber bundle while each end is opened, the vessel having an inlet for mixed gas, an outlet for non-permeated gas, and an outlet for permeated gas.

* * * * *